United States Patent Office 3,058,802
Patented Oct. 16, 1962

3,058,802
METHOD FOR THE PREPARATION OF INORGANIC SELENIDES AND TELLURIDES
Stanley M. Kulifay, Dayton, Ohio, assignor to Monsanto Chemical Company, St. Louis, Mo., a corporation of Delaware
No Drawing. Filed June 13, 1958, Ser. No. 741,747
17 Claims. (Cl. 23—50)

The present invention relates to a new method for the preparation of inorganic metal compounds, such as binary and higher tellurides and selenides, and particularly mercury telluride and mercury selenide. It is an object of the invention to prepare a semiconductor-type of a crystalline form of the said metal compounds. It is a further object of the invention to prepare the said metal compounds by a low-temperature precipitation method employing solutions of nitrogenous reducing agents, such as hydrazine, as a precipitating agent and using simple apparatus. Various nitrogenous reducing agents including hydrazine, hydroxylamine, and the alkyl and aryl derivatives thereof, such as phenylhydrazine, as well as salts, for example the mono- or dihydrochloride may be employed in the present invention.

It is also an object of the invention to prepare metal binary, ternary and higher compounds, such as tellurides and selenides having a precisely-controlled stoichiometric or nonstoichiometric composition. It is also an object of the invention to prepare uniformly "doped" metal tellurides and selenides, by precipitating such modified compounds by means of hydrazine, its derivatives and analogues.

It is a further object of the invention to prepare in essentially quantitative yield various binaries, such as tellurides and selenides and other compounds of metals selected from the group consisting of mercury, platinum, palladium, lead, indium, cobalt, tin, antimony, bismuth, cadmium, nickel, thallium, ruthenium, rhodium, osmium, iridium, copper, silver, gold, tellurium and selenium, by precipitation from soluble compounds by means of hydrazine or the various reducing agents set forth above. The compounds which are made by the present method include mercury cupride, nickel bismuthide and lead platinide.

The prior art methods which have been available for the preparation of semiconductor-type compounds have suffered a disadvantage in that it has been difficult to achieve precise or predictable stoichiometric proportions which are necessary in order to obtain controlled semiconductive properties. The difficulty of obtaining precise proportions by means of prior art methods has also rendered it difficult to obtain reproducible semiconductive properties. For example, the conventional method of preparing mercury telluride has been a relatively high-temperature, long-time (up to 80 hours) fusion of the respective elements. Another method for the preparation of mercury telluride has been by the reaction of solutions of mercury salts with the highly toxic, exceedingly unstable hydrogen telluride in complicated apparatus. Both of these prior art methods have yielded non-stoichiometric mixtures which, being inherently unbalanced, were unpredictable for use as a semiconductor material.

Another difficulty encountered in the methods of the prior art has been the quantitative control of "doping" additives. Such additive materials are employed in minor proportions, which have been difficult to introduce in the precise amounts required to obtain the desired semiconductive properties.

The present method also eliminates the difficult purification of metal tellurides and selenides which involves distilling off the unreacted components at high temperatures from the crude compounds obtained by conventional methods. One of the difficulties which has attended distillation purification is the partial decomposition of the product, with a consequent loss of the desired stoichiometric proportion.

In one embodiment of the present invention the process begins with the production of a solution of the desired purity containing the dissolved compounds of the specific metal or metals and of tellurium or selenium. The components may also be introduced as the respective elements or compounds which are dissolved or vaporized for further reaction. However, the invention may be carried out in any desired medium, preferably selected from the group consisting of solutions, melts and vapors. The media contemplated in the present invention embrace solutions of the metal ions, including tellurium and selenium, as well as liquid media, such as melts exemplified by molten chloride, such as selenium chloride and copper chloride. Vapor phase media are also included, for example mercuric chloride and tellurium chloride with or without a carrier gas.

The concentration employed in different circumstances will be dictated in large part by the solubility of the respective compounds, for example, chlorides or nitrates of mercury, lead, bismuth, cadmium, nickel, platinum, palladium, ruthenium, rhodium, osmium, iridium, thallium, copper, silver and gold and combinations thereof. In general, the concentration of the soluble metal salt and of the soluble tellurium or selenium compound may range up to the solubility limits of the respective compounds. For example, in preparing mercury selenide, the mercuric nitrate was employed as a 20% solution, while the selenous acid was used in 10% to 15% by weight solution. The source materials of the said tellurides or selenides are preferably the acid solutions of the element or oxide or any pure, soluble compound. In general, the proportion of the nitrogenous reducing agent which is employed is 0.1 to 25.0 g. molecular weight (mole) of the said nitrogenous reducing agent per gram atomic weight of the said tellurium or selenium. A preferred range is from 1.0 to 10.0 gram molecular weights. When the reducing agents are mentioned herein, such expressions include not only the reducing agents, per se, but also the salts and derivatives, such as the hydrochlorides and hydrates in which form the said reducing agents are commonly supplied.

The solution as described above may be heated in order to increase the solubility of the respective compounds therein. The pressure under which the process is conducted is usually atmospheric, but is not critical, and moderate pressure may be employed. The time required for the reaction is also a non-critical factor, although reaction appears to be complete after the first few minutes.

The precipitation of the desired metal tellurides and selenides is preferably carried out by adding a combined solution or individual solutions of the said starting materials to a solution of an aqueous ammoniacal hydrazine salt such as the dihydrochloride or other nitrogenous reducing agent. However, the three solutions of the metal, the chalcogen and the reductant may also be mixed simultaneously, or by first adding the reductant to one of the reactants, or to the combined mixture. The strength of such solutions is not critical, although it is necessary to operate with an excess of the solution containing the reductant such as ammoniacal hydrazine dihydrochloride. The present invention may employ either a liquid medium for the precipitation as described above, or a spray-type of precipitation employing liquid sprays of some of the starting materials, such as the metal salts and/or the reducing agent.

The above discussion has been concerned chiefly with the preparation of stoichiometric compounds. However, nonstoichiometric compositions may readily be made by the present method by employing an excess of either the metal or the chalcogen. For example, an excess of 1% by weight of mercury introduced in the preparation of mercury selenide results in the production of a uniform product having 1% mercury as free metal in excess of the theoretical HgSe. The working solutions described above may also contain therein any desired soluble doping compound capable of reduction to the element by the reducing agent, such as copper, silver, gold or the platinum metals.

The by-products of the reaction are soluble, and volatile upon heat-treating for sintering, zone purification, or growing single crystals. These thus do not contaminate the product.

The temperature employed in carrying out the invention may be from 20° C. to 100° C. in aqueous systems or 20° C. to 200° C. in vapor systems in order to obtain a reduction to the desired metal selenide or telluride.

Another embodiment of the present invention based upon the precipitation of binary, and mixed compounds, such as ternary and higher compounds by nitrogenous reducing agents is the employment of a complexing agent in the precipitation. Preferred complexing agents in the present invention include the group of tartaric acid, citric acid and malic acid. It has been found that the use of the said complexing agents makes it possible to carry out the precipitation with more highly concentrated solutions without incurring the precipitation of metal hydroxides or other contaminating basic compounds. The proportion of the complexing agents, such as tartaric acid, may be varied widely, such as over the range of from 0.1% to 20% by weight relative to the weight of the total solution present. The precipitating agents may also be employed as salts, for example the mono- and dihydrochloride salts.

The following examples illustrate specific embodiments of the present invention.

Example 1

The preparation of mercury telluride was carried out by first weighing out 2.0724 g. of mercury which was dissolved by warming with 10 ml. of 1:1 nitric acid. The solution was further acidified with 3 ml. of hydrochloric acid. The tellurium was provided as 1.3190 g. of the powdered element, in equivalent stoichiometric proportion with the mercury. The tellurium was dissolved in the above acid mixture with the aid of 8 ml. of aqua regia.

A solution containing the hydrazine precipitating agent was prepared from 15 g. of hydrazine dihydrochloride dissolved in 150 ml. of water and 50 ml. of ammonium hydroxide. The hydrazine salt was completely dissolved and the solution was heated to boiling, after which the solution of mixed mercury and tellurium compounds was added thereto with constant stirring. A puffy, black precipitate of mercury telluride, which formed during the stirring operation, soon formed a dense, black powder. After boiling for 90 minutes, the product was obtained by filtering the solution and washing the precipitate with water, followed by methanol. The product was dried at 95° C., and the yield was 98.5% (small mechanical losses occur in preparation). It was analyzed by X-ray diffraction analysis and was found to be face-centered cubic in structure and to have the stoichiometric proportion of the compound HgTe. The lattice constant for the compound was 6.44. No other crystalline material, such as uncombined Te, could be detected.

Example 2

The preparation of mercury selenide was carried out by preparing a nitric acid solution containing 2.0658 g. of mercury and 0.8140 g. of selenium. The mixed solutions of the elements was precipitated by pouring the same into boiling hydrazine dihydrochloride solution in accordance with the method of Example 1. The product was a black, face-centered cubic micro-crystalline powder having the formula, HgSe, and having a lattice diffraction constant of $6.077 \pm 0.01$ Angstroms. The yield obtained was 98.7% and no other crystalline material, such as uncombined Se, could be detected. The particle size was found to be from 0.1 micron to 1 micron.

Example 3

The preparation of copper selenide, $Cu_2Se$, was conducted by first dissolving 3.9928 g. of cupric acetate monohydrate in a dilute nitric acid solution, to which there was then added 0.7896 g. of selenium powder dissolved in 9 ml. 2:1 nitric acid. This combined solution was slowly poured into a boiling solution of aqueous hydrazine dihydrochloride rendered ammoniacal with ammonium hydroxide. The product was produced as a black, cubic microcrystalline powder which was subjected to X-ray diffraction analysis and found to have the X-ray powder diagram of $Cu_2Se$.

Example 4

A copper telluride, $Cu_{1.4}Te$, was prepared by the method of Example 1, utilizing a starting solution containing 1.2761 g. of tellurium and 1.1136 g. of copper oxide. The product was obtained in 99.1% yield and had an X-ray powder diagram of $Cu_{2-x}Te$ where $X=0.6$.

Example 5

Beta-silver selenide having a formula, $Ag_2Se$, was prepared utilizing 3.3979 g. of silver nitrate dissolved in water, to which there was then added 0.7896 g. of selenium dissolved in dilute nitric acid. The mixed solutions were then made ammoniacal and added to boiling aqueous ammoniacal hydrazine dihydrochloride prepared in accordance with the method of Example 1. The product was obtained in 99.6% yield as a black microcrystalline powder whose D values for the calculation of the lattice constant agreed with those in the literature (ASTM). No uncombined Ag or Se could be detected.

Example 6

Silver telluride having the formula, $Ag_2Te$, was prepared from 3.3979 g. of silver nitrate dissolved in water, to which there was then added 1.2761 g. of tellurium dissolved in 1:1 aqua regia. The mixed solutions were then made ammoniacal and precipitated by addition to ammoniacal aqueous hydrazine dihydrochloride to obtain in 99.5% yield a black microcrystalline ortho-rhombic powder. This was tested by X-ray diffraction analysis and was found to correspond to the formula, $Ag_2Te$ and to have lattice constants of $a_0=16.27$, $b_0=26.68$, $c_0=7.55$. No uncombined Ag or Te could be detected.

Example 7

The use of phenylhydrazine as a precipitating agent is shown in the following method for the preparation of mercury telluride. The mercury was provided as 1.9278 g. of mercury which was placed in a 300 ml. beaker and dissolved by warming with 10 ml. of 1:1 nitric acid. The tellurium was provided as 1.2250 g. of the powdered element in equivalent stoichiometric proportion with the mercury. The tellurium was dissolved with the aid of 16 ml. of 1:1 aqua regia.

A solution containing the phenylhydrazine precipitating agent was prepared from 15 ml. of phenylhydrazine slurried in 150 ml. of water plus 21 ml. of concentrated HCl plus 50 ml. concentrated $NH_4OH$. The phenylhydrazine solution was heated to boiling, after which the working solution of mixed mercury and tellurium compounds was added with constant stirring. A black precipitate of mercury telluride which formed during the stirring operation was found to crystallize as a dense, black powder. After the precipitation had been completed, the product was separated by filtering off the supernatant liquid and then washing the precipitate with water, followed by methanol. The product was dried at 95° C. and the yield found to be 99%. The microcrystalline black product was analyzed by X-ray diffraction analysis and was found to be face-centered cubic in structure and to be the compound HgTe. The lattice constant for the compound was 6.44. X-ray diffraction analysis also indicated that no other crystalline material such as uncombined tellurium was present.

*Example 8*

Silver selenide having the formula, $Ag_2Se$, was prepared by employing hydroxylamine as the precipitating agent. The silver was provided as 2.1576 g. of the silver ion originating from silver nitrate, which was placed in a 300 ml. beaker and dissolved in 15 ml. of water. The selenium was provided as 0.7896 g. of the powdered element in equivalent stoichiometric proportion with the silver to obtain as the final product the compound, $Ag_2Se$. It was dissolved in 9 ml. 2:1 $HNO_3$. The hydroxylamine was provided in an aqueous solution containing 15 g. of hydroxylamine hydrochloride dissolved in 150 ml. of water and 50 ml. of concentrated ammonium hydroxide. The hydroxylamine solution was heated to boiling, after which the working solution of mixed silver and selenium compounds previously treated with 40 ml. concentrated $NH_4OH$ was added with constant stirring. A precipitate of the silver selenide was formed during the heating operation and was found to crystallize as a dense, dark gray powder. After the precipitation had been completed the product was separated by filtering off the supernatant liquid and then washing the precipitate with water, followed by methanol. The product was dried at 95° C. and was found to be present in 99.4% yield. The microcrystalline, black product was analyzed by X-ray diffraction analysis and was found to be the compound, $Ag_2Se$, without the presence of either silver metal or selenium per se.

*Example 9*

Further preparations carried out by the method of Example 1 were prepared utilizing various proportions as indicated in the table below, which also shows the lattice constant obtained for the respective compounds.

| Compound | Lattice Constants | Yield, percent |
|---|---|---|
| Hexagonal $PtTe_2$ | $a_0=4.02$  $c_0=5.21$ ($CdI_2$ type) | 100.1 |
| Hexagonal $PdTe_2$ | $a_0=4.04$  $c_0=5.13$ ($CdI_2$ type) | 99.8 |
| Face-centered cubic CdSe (usual form hexagonal). | $a_0=6.3$ | 100.2 |

*Example 10*

When tartaric acid was used as a complexing agent in quantities sufficient to prevent metal hydroxides and other basic compounds from precipitating the following additional compounds were obtained: $Bi_2Te_3$, PbTe, and $Au_2Te_3$.

A detailed exposition of the use of tartaric acid as a complexing agent was demonstrated in the preparation of nickel selenide having the formula, NiSe. This preparation was carried out by first providing a working solution by dissolving 2.3770 g. of $NiC_2 \cdot 6H_2O$ in 15 ml. of water and thereafter adding a solution of 0.7896 g. of elemental selenium dissolved in 9 ml. 2:1 $HNO_3$. The precipitating agent in this case was hydrazine, which was prepared from 15 g. of hydrazine dihydrochloride dissolved in 150 ml. of water, 6 g. of tartaric acid and 50 ml. of ammonium hydroxide. This proportion of tartaric acid corresponds to about 2.5% by weight relative to the total weight of the solution. The precipitation was carried out by adding the solution containing the nickel ions and selenium ions to the boiling, aqueous hydrazine-tartrate solution. It was found that the use of the said complexing agent made it possible to operate without precipitating metal hydroxides. The above-described precipitation was conducted with constant stirring, resulting in the production of a black precipitate of nickel selenide, which soon changed to a dense, black powder. The mixture was then boiled in the mother liquor for 1½ hours, adding 20 ml. portions of $NH_4OH$ after 45 and 60 minutes, respectively, after which the product was obtained by filtering the solution and washing the precipitate with water, followed by methanol. The product was dried at 95° C. and was found to be present in a yield of 98.5%. It was analyzed by the X-ray diffraction method and was found to be hexagonal in structure and to have the stoichiometric proportion of the compound, NiSe. The lattice constants for the compound were $a_0=3.66$ Angstroms and $c_0=5.33$ Angstroms. No other crystalline material such as uncombined nickel or selenium could be detected.

*Example 11*

The method of the preceding example was employed in the production of lead selenide having the formula, PbSe, with the aid of citric acid as a complexing agent. The citric acid was present in the proportion of about 3% by weight relative to the total weight of the solution. The lattice constant which was found to be characteristic of face-centered cubic lead selenide was 6.124 Angstroms.

*Example 12*

This method of precipitating in the presence of a complexing agent was also employed using about 5% by weight of tartaric acid relative to the weight of the total solution to produce bismuth selenide and thallium selenide. The respective products were black, microcrystalline materials. The ASTM X-ray powder data for the $Bi_2Se_3$ sample was found to agree with that in the literature. The thallium selenide TlSe, like the $Bi_2Se_3$ was recovered in substantially quantitative yield and found to contain no detectable, free thallium, selenium, or thallous chloride.

What is claimed is:

1. Method for the preparation of mercury telluride, which comprises precipitating dissolved mercury and tellurium ions by admixture with aqueous ammoniacal hydrazine dihydrochloride in the proportion of from 0.1 to 25.0 molecular weights per atomic weight of the said tellurium, and isolating the desired compound from the mixture.

2. Method for the preparation of copper selenide, which comprises precipitating dissolved copper and selenium ions by admixture with aqueous ammoniacal hydrazine dihydrochloride in the proportion of from 0.1 to 25.0 molecular weights per atomic weight of the said selenium, and isolating the desired compound from the mixture.

3. Method for the preparation of mercury selenide, which comprises precipitating dissolved mercury and selenium ions by admixture with aqueous ammoniacal hydrazine dihydrochloride in the proportion of from 0.1 to 25.0 molecular weights per atomic weight of the said selenium, and isolating the desired compound from the mixture.

4. Method for the preparation of copper telluride, which comprises precipitating dissolved copper and tellurium ions by admixture with aqueous ammoniacal hydrazine dihydrochloride in the proportion of from 0.1 to 25.0 molecular weights per atomic weight of the said tellurium, and isolating the desired compound from the mixture.

5. Method for the preparation of silver selenide, which comprises precipitating dissolved silver and selenium ions by admixture with aqueous ammoniacal hydrazine dihydrochloride in the proportion of from 0.1 to 25.0 molecular weights per atomic weight of the said selenium, and isolating the desired compound from the mixture.

6. Method for the preparation of silver telluride, which comprises precipitating dissolved silver and tellurium ions by admixture with aqueous ammoniacal hydrazine dihydrochloride in the proportion of from 0.1 to 25.0 molecular weights per atomic weight of the said tellurium, and isolating the desired compound from the mixture.

7. Method for the preparation of platinum telluride, which comprises precipitating dissolved platinum and tellurium ions by admixture with aqueous ammoniacal hydrazine dihydrochloride in the proportion of from 0.1 to 25.0 molecular weights per atomic weight of the said tellurium, and isolating the desired compound from the mixture.

8. Method for the preparation of bismuth selenide, which comprises precipitating dissolved bismuth and selenium ions by admixture with aqueous ammoniacal hydrazine dihydrochloride in the proportion of from 0.1 to 25.0 molecular weights per atomic weight of the said selenium, and isolating the desired compound from the mixture.

9. Method for the preparation of palladium telluride, which comprises precipitating dissolved palladium and tellurium ions by admixture with aqueous ammoniacal hydrazine dihydrochloride in the proportion of from 0.1 to 25.0 molecular weights per atomic weight of the said tellurium, and isolating the desired compound from the mixture.

10. Method for the preparation of bismuth telluride, which comprises precipitating dissolved bismuth and tellurium ions by admixture with aqueous ammoniacal hydrazine dihydrochloride in the proportion of from 0.1 to 25.0 molecular weights per atomic weight of the said tellurium, and isolating the desired compound from the mixture.

11. Method for the preparation of gold telluride, which comprises precipitating dissolved gold and tellurium ions by admixture with aqueous ammoniacal hydrazine dihydrochloride in the proportion of from 0.1 to 25.0 molecular weights per atomic weight of the said tellurium, and isolating the desired compound from the mixture.

12. Method for the preparation of cadmium selenide, which comprises precipitating dissolved cadmium and selenium ions by admixture with aqueous ammoniacal hydrazine dihydrochloride in the proportion of from 0.1 to 25.0 molecular weights per atomic weight of the said selenium, and isolating the desired compound from the mixture.

13. Method for the preparation of lead telluride, which comprises precipitating dissolved lead and tellurium ions by admixture with aqueous ammoniacal hydrazine dihydrochloride in the proportion of 0.1 to 25.0 molecular weights per atomic weight of the said tellurium, and isolating the desired compound from the mixture.

14. Method for the preparation of a compound selected from the class consisting of the mercury, platinum, palladium, indium, cobalt, tin, antimony, bismuth, cadmium, nickel, thallium, ruthenium, rhodium, osmium, iridium, copper, silver and gold tellurides and selenides, which comprises precipitating the desired compounds containing the respective members thereof by admixture with an aqueous ammoniacal solution of a nitrogenous reducing agent of the group consisting of hydrazine, hydroxyl amine, and phenylhydrazine in the proportion of from 0.1 to 25.0 molecular weights of said precipitating agent per atomic weight of the said tellurium and selenium and isolating the desired compound from the mixture.

15. Method for the preparation of a compound selected from the class consisting of the mercury, platinum, palladium, indium, cobalt, tin, antimony, bismuth, cadmium, nickel, thallium, ruthenium, rhodium, osmium, iridium, copper, silver and gold tellurides and selenides, which comprises precipitating the desired compound from solutions containing the respective ions thereof by admixture with an aqueous ammoniacal solution of hydrazine in the proportion of from 0.1 to 25.0 molecular weights of the said hydrazine per atomic weight of the said tellurium and selenium, and isolating the desired compound from the mixture.

16. Method for the preparation of compounds selected from the class consisting of the tellurides and selenides of mercury, platinum, palladium, indium, cobalt, tin, antimony, bismuth, cadmium, nickel, thallium, ruthenium, rhodium, osmium, iridium, copper, silver and gold, which comprises precipitating the said composition by admixture of a solution containing the desired metal ions and the ions of a compound selected from the class consisting of tellurium and selenium by admixture with a solution of an aqueous ammoniacal nitrogenous reducing agent of the group consisting of hydrazine, hydroxyl amine, and phenylhydrazine in the proportion of from 0.1 to 25.0 molecular weights of the said nitrogenous reducing agent per atomic weight of tellurium and selenium and isolating the desired compound from the mixture.

17. Method for the preparation of compounds selected from the class consisting of the tellurides and selenides of mercury, platinum, palladium, indium, cobalt, tin, antimony, bismuth, cadmium, nickel, thallium, ruthenium, rhodium, osmium, iridium, copper, silver and gold, which comprises precipitating the said composition by admixture of a solution containing the desired metal ions and the ions of a compound selected from the class consisting of tellurium and selenium by admixture with a solution of a nitrogenous reducing compound of the group consisting of hydrazine, hydroxylamine and phenylhydrazine in the proportion of from 0.1 to 25.0 molecular weights of the said nitrogenous reducing agent per atomic weight of the said tellurium and selenium, the said precipitation being conducted in the presence of a compound selected from the group consisting of tartaric acid, citric acid and malic acid, the proportion of the said complexing agents being from 0.1% to 20% by weight relative to the weight of total solutions present and isolating the desired compound from the mixture.

References Cited in the file of this patent

UNITED STATES PATENTS

| | | |
|---|---|---|
| 2,534,562 | Thomsen | Dec. 19, 1950 |
| 2,860,954 | Bueker et al. | Nov. 18, 1958 |

FOREIGN PATENTS

| | | |
|---|---|---|
| 142,728 | Australia | Aug. 6, 1951 |

OTHER REFERENCES

Mellor: "Comprehensive Treatise on Inorganic and Theoretical Chemistry," Longmans, Green and Co., New York, vol. 10, pages 769, 771, 777, 778, 786, 794 and 801 (1930); vol. 11, pages 29, 45, 49, 52, 56 and 60 (1931).

Thorpe: "Dictionary of Applied Chemistry," Longmans, Green and Co., New York, vol. V, page 434 (1916).

Hovorka in "Chemical Abstracts," vol. 27, col. $5020^2$ (1933).

Hovorka in "Chem. Listy," vol. 27, pages 25 to 31, and 49 to 51 (1933).